United States Patent [19]
Burnett et al.

[11] 4,031,702
[45] June 28, 1977

[54] MEANS FOR ACTIVATING HYDRAULIC MOTORS

[76] Inventors: James T. Burnett, River Bank Road, Batesville, Ark. 72501; Arnold P. Hendrix, Rte. 1, Box 775, Atoka, Tenn. 38004

[22] Filed: Apr. 14, 1976

[21] Appl. No.: 677,018

[52] U.S. Cl. .................................. 60/398; 60/413; 60/641; 126/270

[51] Int. Cl.² ...................... F15B 1/02; F15B 18/00

[58] Field of Search ............ 60/398, 641, 643, 509, 60/325, 327, 413; 126/270, 271; 417/330, 331, 337

[56] References Cited
UNITED STATES PATENTS

| 291,147 | 1/1884 | Calver | 126/270 |
|---|---|---|---|
| 644,093 | 2/1900 | Place | 417/331 |
| 943,000 | 12/1909 | Busby | 60/398 |
| 1,073,214 | 9/1913 | Carr | 417/330 |
| 2,597,050 | 5/1952 | Audemar | 92/119 X |
| 2,872,915 | 2/1959 | Bowen | 126/271 |
| 3,487,228 | 12/1969 | Kriegel | 60/413 |
| R17,657 | 5/1930 | Bamford et al. | 60/397 |

*Primary Examiner*—Edgar W. Geoghegan
*Attorney, Agent, or Firm*—John R. Walker, III

[57] ABSTRACT

At least one device for generating power from sunlight, wind and/or water movement supplies power to a hydraulic pump which uses such power to pump hydraulic fluid to a tank which receives and stores the hydraulic fluid under a constant pressure. The hydraulic fluid stored within the tank is allowed to selectively pass to a hydraulic motor whereby the hydraulic motor is activated.

2 Claims, 2 Drawing Figures

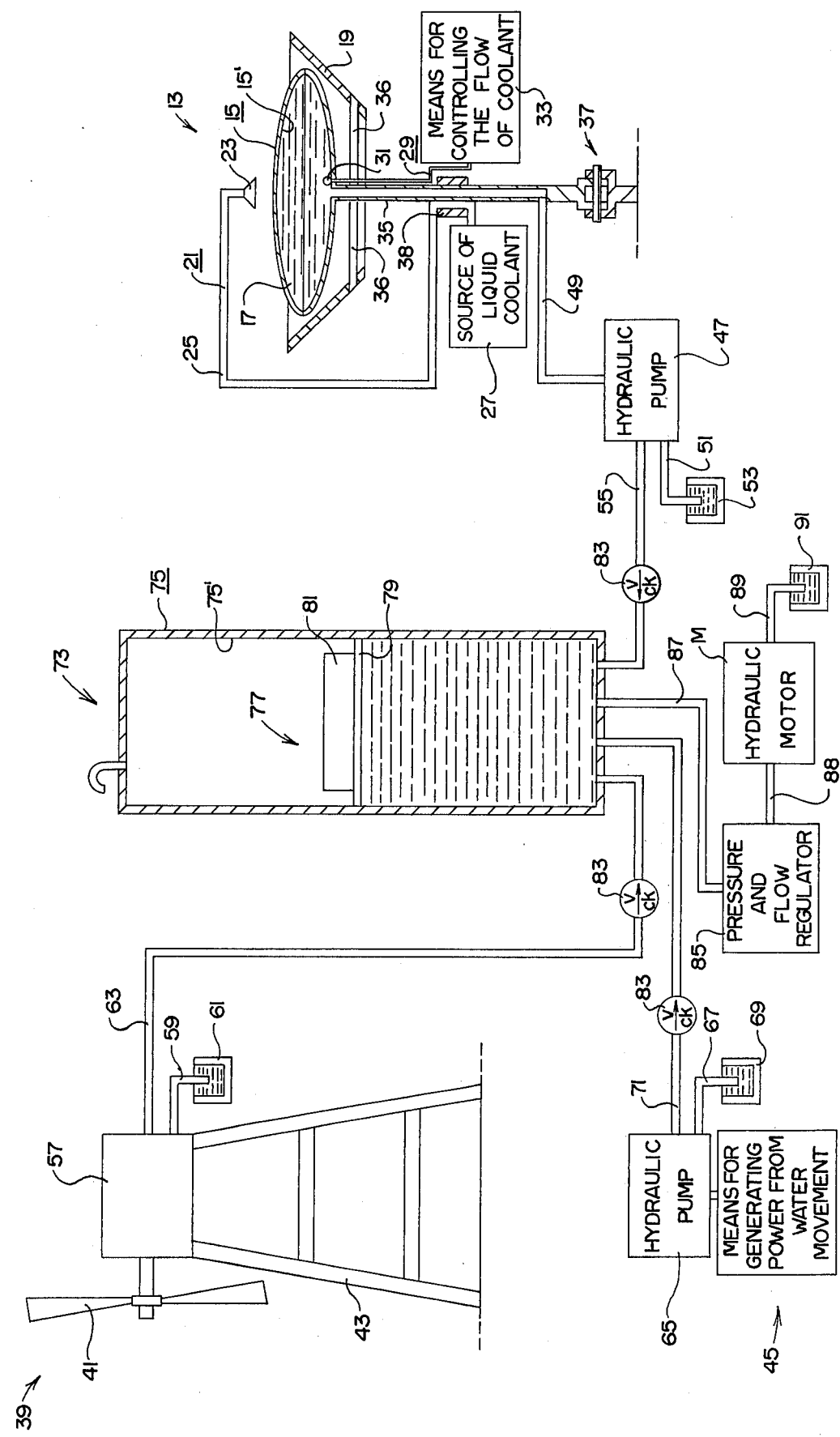

MEANS FOR ACTIVATING HYDRAULIC MOTORS

BACKGROUND OF THE INVENTION

1. Field of the Invention

This invention relates generally to means for generating energy from natural environmental sources such as sunlight, wind and/or moving water and for utilizing such energy to activate work producing devices such as hydraulic motors.

2. Description of the Prior Art

Hertofore, various means for generating energy from natural environmental sources have been developed. See, for example, Ketchum, U.S. Pat. No. 784,005; Snee, U.S. Pat. No. 1,001,176; Hays, U.S. Pat. No. 2,454,058; Jacobs, U.S. Pat. No. 2,628,564; Rowekamp, U.S. Pat. No. 2,969,637; Podolny, U.S. Pat. No. 3,070,703; Mileti et al., U.S. Pat. No. 3,315,085; Winsel, U.S. Pat. 3,484,617; Ashikian, U.S. Pat. No. 3,752,395; Haanen, U.S. Pat. No. 3,806,733; Martin, U.S. Pat. No. 3,901,036; and Glickman, U.S. Pat. No. 3,903,700. None of the above means disclose or suggest the present invention.

None of the known prior means for generating energy from natural environmental sources have proved to be entirely satisfactory. One major problem with such prior means is the possibility of no energy being generated due to the nonreliableness of the natural environmental sources. For example, there are periods when the sun doesn't shine enough for energy to be generated therefrom, when the wind doesn't blow enough for energy to be generated therefrom, and when water doesn't move enough for energy to be generated therefrom. The prior art attempted to solve this problem by providing means for storing excess energy generated from the natural environmental sources when such energy is being generated for use when such energy is not being generated. However, this solution works only when the period during which no energy is being generated is not prolonged. Another problem with prior means for generating energy from sunlight is the slowness by which such energy is generated.

SUMMARY OF THE INVENTION

The present invention is directed towards overcoming the problems and disadvantages of prior means for generating energy from natural environmental sources. The present invention provides a hydraulic motor activating means which includes, in general, a power generating means for generating power from environmental sources, a hydraulic pump means for using the power generated by the power generating means to pump hydraulic fluid, a tank means for receiving and storing the hydraulic fluid pumped by the hydraulic pump means, the tank means including means for maintaining the hydraulic fluid under a constant pressure, and means for allowing the hydraulic fluid stored within the tank means to selectively pass to a hydraulic motor whereby the hydraulic motor is activated. The present invention preferably includes at least one power generating device for generating power from sunlight and at least one power generating device for generating power from an environmental source other than sunlight. The power generating device for generating power from sunlight preferably includes means for allowing fast cycling operation of the power generating device.

BRIEF DESCRIPTION OF THE DRAWING

The drawing is a somewhat diagrammatic view of the means for activating hydraulic motors of the present invention shown combined with a hydraulic motor.

DESCRIPTION OF THE PREFERRED EMBODIMENT

Referring to the drawing, the means for activating hydraulic motors of the present invention is indicated generally at 11. The means 11 includes, in general, means for generating power from natural environmental sources, means for using such generated power to pump hydraulic fluid, means for receiving and storing such pumped hydraulic fluid, and means for allowing the stored hydraulic fluid to pass to one or more hydraulic motors M to activate the same.

The means for generating power from natural environmental sources of the means 11 may include one or more power generating means 13 for generating power from sunlight. Each power generating means 13 preferably includes a solar heat absorbing means 15 for absorbing heat from sunlight. The solar heat absorbing means 15 may be of any construction well known to those skilled in the art. Preferably, the solar heat absorbing means 15 is constructed in a substantially flat, pancake-like shape with a substantially hollow interior 15'. A quantity of heat absorbing expandable gas 17 such as freon or the like is provided within the substantially hollow interior 15' of the solar heat absorbing means 15 so that when the solar heat absorbing means 15 absorbs heat from the sunlight, the gas 17 will expand. The power generating means 13 preferably includes reflector means 19 for causing sunlight to be directed against the underneath side of the solar heat absorbing means 15 to thereby maximize the amount of heat the solar heat absorbing means 15 can absorb from any given quantity of sunlight. The power generating means 13 may include coolant spray means 21 for spraying a liquid coolant over the exterior of the solar heat absorbing means 15 when the temperature of the quantity of heat absorbing expandable gas 17 within the hollow interior 15' of the solar heat absorbing means 15 is above a set amount for reasons which will hereinafter become apparent. The coolant spray means 21 preferably includes a spray head 23 for directing the liquid coolant against the exterior of the solar heat absorbing means 15 and preferably includes a connecting line 25 for connecting the spray head 23 to a source 27 of liquid coolant. The power generating means 13 may include a thermostat device 29 of a construction well known to those skilled in the art for sensing the temperature of the quantity of heat absorbing expandable gas 17 within the hollow interior 15' of the solar heat absorbing means 15 and for controlling the flow of liquid coolant through the coolant spray means 21 to cause the coolant spray means 21 to spray a liquid coolant over the solar heat absorbing means 15 when the temperature of the quantity of heat absorbing expandable gas 17 within the hollow interior 15' of the solar heat absorbing means 15 is above a set amount. The thermostat device 29 preferably includes a thermostat 31 of known construction positioned within the hollow interior 15' of the solar heat absorbing means 15 and preferably includes means 33 (such as a solenoid or the like of known construction) for controlling the flow of coolant through the connecting line 25 in a well known manner in response to the temperature of the gas 17 within the hollow interior 15' of the solar heat absorbing means 15. The power generating means 13 preferably includes support means 35 for supporting the solar heat absorbing means 15 and the reflector means 19. The support means 35 preferably includes strut-like members 36 for fixing the reflector means 19 relative to the solar heat absorbing means 15. The support means 35 preferably includes a gimbal-like device 37 for allowing the solar heat absorbing means 15 and the reflector means 19 to be positioned so as to receive the maximum sunlight. The coolant spray means 21 is preferably fixedly attached to the supporting means 35 as by the band 38. It should be noted that a device (not shown) such as a clockwork or the like may be provided to automatically move the solar heat absorbing means 15 and the reflector means 19 to correspond with the motion of the sun. Such devices are well known to those skilled in the art.

The means for generating power from natural environmental sources of the means 11 may include one or more power generating means 39 for generating power from wind. The power generating means 39 may be of any well-known construction such as a windmill 41 positioned on a tower 43.

Additionally, the means for generating power from natural environmental sources of the means 11 may include one or more power generating means 45 for generating power from water movement. The power generating means 45 may be of any well-known construction such as a water wheel or a wave-driven device.

The means for using the power generated by the means for generating power from natural environmental sources of the means 11 may include one or more hydraulic pumps 47 for using the power generated by the power generating means 13 to pump hydraulic fluid. The hydraulic pump 47 may be of any well-known construction which utilizes power in the form of pulsating gas to pump hydraulic fluid. A hollow conduit or line 49 is provided for connecting the solar heat absorbing means 15 and the hydraulic pump 47 and for allowing the gas 17 to pass between the hollow interior 15' of the solar heat absorbing means 15 and the hydraulic pump 47. The hydraulic pump 47 includes an inlet line 51 for drawing in hydraulic fluid from a reservoir 53 and includes an outlet line 55 for discharging hydraulic fluid.

The means for using the power generated by the means for generating power from natural environmental sources of the means 11 may include one or more hydraulic pumps 57 for using the power generated by the power generating means 39 to pump hydraulic fluid. The hydraulic pump 57 may be of any well-known construction which utilizes rotating power to pump hydraulic fluid. The hydraulic pump 57 includes an inlet line 59 for drawing in hydraulic fluid from a reservoir 61 and includes an outlet line 63 for discharging hydraulic fluid.

Additionally, the means for using the power generated by the means for generating power from natural environmental sources of the means 11 may include one or more hydraulic pumps 65 for using the power generated by the power generating means 45 to pump hydraulic fluid. The hydraulic pump 65 may be of any well-known construction which utilizes power generated from water movement to pump hydraulic fluid. The hydraulic pump 65 includes an inlet line 67 for drawing in hydraulic fluid from a reservoir 69 and includes an outlet line 71 for discharging hydraulic fluid.

The means for receiving and storing the pumped hydraulic fluid of the means 11 may include one or more vented tank means 73. Each tank means 73 preferably includes a hollow tank member 75 for holding the hydraulic fluid and preferably includes means 77 for maintaining the hydraulic fluid held within the tank member 75 under a constant pressure. The outlet lines 55, 63, 71 of the hydraulic pumps 47, 57, 65, respectively, are preferably communicated with the bottom of the tank member 75. The means 77 for maintaining the hydraulic fluid held within the tank member 75 under a constant pressure preferably includes a piston-like member 79 slidably mounted within the interior of the tank member 75 in a fluid-tight relationship with the interior walls 75' of the tank member 75 above the hydraulic fluid held within the tank member 75 and preferably includes a weight member 81 attached to the piston-like member 79 for utilizing the force of gravity to maintain the hydraulic fluid held within the tank member 75 under a constant pressure. It should be noted that each of the outlet lines 55, 63, 71 are preferably provided with a check valve 83 for preventing any hydraulic fluid from backflowing from the tank member 75 to any of the hydraulic pumps 47, 57, 65.

The means for allowing the hydraulic fluid stored within the tank means 73 to pass to at least one hydraulic motor M whereby the hydraulic motor M is activated may include at least one pressure and flow regulator 85 for allowing the hydraulic fluid to selectively pass from the tank means 73 to the hydraulic motor M. The pressure and flow regulator 85 is of a construction and operation well known to those skilled in the art. A hollow conduit or line 87 is preferably provided to connect the tank means 73 to the pressure and flow regulator 85 and to allow the hydraulic fluid to pass from the hollow tank member 75 of the tank means 73 to the pressure and flow regulator 85. The hydraulic motor M may be of any well-known construction which utilizes power in the form of pressurized hydraulic fluid. A hollow conduit or line 88 is preferably provided to connect the pressure and flow regulator 85 and the hydraulic motor M and to allow hydraulic fluid to pass from the pressure and flow regulator 85 to the hydraulic motor M. The hydraulic motor M preferably includes an outlet line 89 leading to a reservoir 91.

The operation of the means 11 for activating hydraulic motors is quite simple. Power in the form of pumped hydraulic fluid is formed by power generating means 13 for generating power from sunlight, power generating means 35 for generating power from wind, and/or power generating means 45 for generating power from water movement. This pumped hydraulic fluid then passes through the various lines and conduits to be stored in the tank means 73 under a constant pressure. When it is desired to activate the hydraulic motor M, the pressure and flow regulator 85 is set to allow hydraulic fluid to pass from the tank means 73 to the hydraulic motor M through the lines 87, 88.

It should be noted that the reservoirs 53, 61, 69, 91 are preferably interconnected with one another by suitable means, not shown, to allow recirculation of the hydraulic fluid, or if desired may be a single reservoir to which the lines are connected.

Although the invention has been described and illustrated with respect to a preferred embodiment thereof, it is not to be so limited since changes and modifications may be made therein which are within the full intended scope of the invention.

We claim:
1. Means for activating hydraulic motors, said means comprising:
   a. at least one power generating means for generating power from sunlight, said power generating means including a solar heat absorbing means having a hollow interior, including a quantity of heat absorbing expandable gas within said hollow interior of said solar heat absorbing means, including reflector means for allowing sunlight to be directed against substantially all portions of said solar heat absorbing means, including coolant spray means for spraying a liquid coolant over said solar heat absorbing means when the temperature of said quantity of heat absorbing expandable gas within said hollow interior of said solar heat absorbing means is above a set amount, including support means for supporting said solar heat absorbing means and said reflector means, and including a thermostat device for sensing the temperature of said quantity of heat absorbing expandable gas within said hollow interior of said solar heat absorbing means and for controlling the flow of liquid coolant through said coolant spray means, said support means including a gimbal-like device for allowing said solar heat absorbing means and said reflector means to be positioned so as to receive the maximum effect of the sun's rays;
   b. hydraulic pump means connected to said power generating means for using the power generated by said power generated means to pump hydraulic fluid;
   c. tank means connected to said hydraulic pump means for receiving and storing the hydraulic fluid pumped by said hydraulic pump means, said tank means including means for maintaining the hydraulic fluid under a constant pressure; and
   d. means for allowing the hydraulic fluid stored within said tank means to selectively pass to a hydraulic motor whereby the hydraulic motor is activated.

2. Means for activating hydraulic motors, said means comprising:
   a. at least one power generating means for generating power from sunlight, said power generating means including a solar heat absorbing means having a hollow interior, including a quantity of heat absorbing expandable gas within said hollow interior of said solar heat absorbing means, including reflector means for allowing sunlight to be directed against substantially all portions of said solar heat absorbing means, including coolant spray means for spraying a liquid coolant over said solar heat absorbing means when the temperature of said quantity of heat absorbing expandable gas within said hollow interior of said solar heat absorbing means is above a set amount, including support means for supporting said solar heat absorbing means and said reflector means, and including a thermostat device for sensing the temperature of said quantity of heat absorbing expandable gas within said hollow interior of said solar heat absorbing means and for controlling the flow of liquid coolant through said coolant spray means, said support means including a gimbal-like device for allowing said solar heat absorbing means and said reflector means to be positioned so as to receive the maximum effect of the sun's rays;
   b. hydraulic pump means connected to said power generating means for generating power from sunlight for using the power generated by said power generating means for generating power from sunlight to pump hydraulic fluid;
   c. at least one power generating means for generating power from wind;
   d. hydraulic pump means connected to said power generating means for generating power from wind for using the power generated by said power generating means for generating power from wind to pump hydraulic fluid;
   e. at least one power generating means for generating power from the movement of water;
   f. hydraulic pump means connected to said power generating means for generating power from the movement of water for using the power generated by said power generating means for generating power from the movement of water to pump hydraulic fluid;
   g. tank means connected to each of said hydraulic pump means for receiving the hydraulic fluid pumped by each of said hydraulic pump means, said tank means including a hollow tank membe for holding the hydraulic fluid and including means for maintaining the hydraulic fluid held within said tank member undeer a constant pressure, said means for maintaining the hydraulic fluid within said tank member under a constant pressure including a piston-like member slidably mounted within the interior of said tank member in a fluid-tight relationshp with the interior walls of said tank member above the hydraulic fluid held within said tank member and including a weight member attached to said piston-like member for utilizing the force of gravity to maintain the hydraulic fluid held within said tank member under a constant pressure; and
   h. means connected to said tank means for allowing the hydraulic fluid held within said tank member of said tank means to selectively pass to a hydraulic motor whereby the hydraulic motor is activated.

* * * * *